No. 786,223. PATENTED MAR. 28, 1905.
E. KREBS.
WHEEL.
APPLICATION FILED MAY 31, 1904.
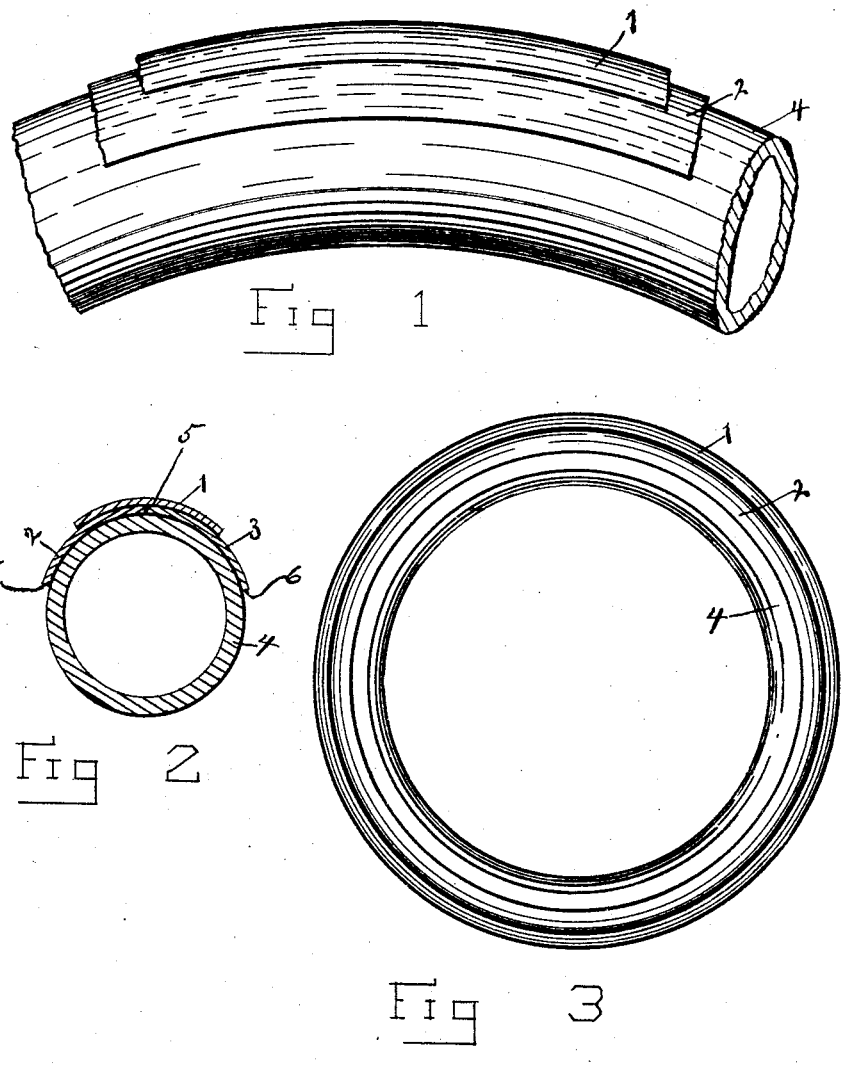
Witnesses
J. A. Sheffer
John A. Weidman
Inventor
Edward Krebs
By his Atty
E. G. Avery No. 786,223.  Patented March 28, 1905.

UNITED STATES PATENT OFFICE.

EDWARD KREBS, OF ALBANY, NEW YORK.

WHEEL.

SPECIFICATION forming part of Letters Patent No. 786,223, dated March 28, 1905.

Application filed May 31, 1904. Serial No. 210,479.

*To all whom it may concern:*

Be it known that I, EDWARD KREBS, a citizen of the United States, residing at Albany, New York, have invented certain new and useful Improvements in Wheels; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention has relation to resilient protective tires for the ordinary rubber tires of bicycle-wheels and other similar wheels however used.

In the drawings, Figure 1 shows a side elevation of a part of the rubber tire of a bicycle with my improved resilient or spring tire attached, Fig. 2 a cross-section of Fig. 1, and Fig. 3 a side elevation of a full tire.

As seen in Fig. 2, my tire consists of two metallic side strips 2 and 3, divided lengthwise in the center, 2 lying along the left side of the rubber tire all the way round, and 3 lying along the right-hand side of the tire in a similar manner. Over this metallic and resilient tire 2 and 3, and so as to cover the opening 5, I spring on the metallic outer guard-tire 1, which holds the under separted tire 2 and 3 tightly in place. The tire 2 and 3 preferably should be without special affixing devices and be held in position on the main resilient tire by friction and pressure only. The object gained is that the separation or parting between the pieces or halves 2 and 3 of the under metallic (other material may be used, if desired) tire runs circumferentially around the rubber tire and may spring easily without abrading, or "chewing," as it is sometimes called, the face of the rubber tire and the outer guard 1 moves only on the surface of the two halves of tire 2 and 3 and does no harm whatever, the opening 5 allowing a downward spring upon the rubber tire 4 at this point, operating circumferentially along the rubber tire instead of crosswise the tire. The inner edges 6 of the tire 2 and 3 should be simply rounded slightly, so as not to cut the rubber tire 4 by any downward motion of that tire.

Having now described my invention so that those skilled in the art may know how to make and use the same, what I claim, and desire to secure by Letters Patent, is—

1. A tire for a wheel consisting of a main resilient tire; a supplemental resilient tire consisting of separate strips passing circumferentially over and in frictional connection only with the said main tire, the supplemental tire arranged to act in unison with the main resilient tire; an outer resilient covering-tire sprung on and over the supplemental tire running circumferentially over the two under tires and holding the supplemental tire and itself in place by pressure and friction only substantially as described.

2. A tire for a wheel consisting of a main resilient tire; a supplemental resilient tire composed of separated strips passing circumferentially over and in movable connection with the said main tire; an outer resilient tire sprung on the supplementary tire and running circumferentially over the two under tires and holding itself in place by pressure and friction only substantially as described.

In testimony whereof I affix my signature in presence of two witnesses.

EDWARD KREBS.

Witnesses:
WILLIAM KREBS,
LEANDER BARNABAS.